United States Patent [19]

Klein et al.

[11] Patent Number: 4,915,474
[45] Date of Patent: Apr. 10, 1990

[54] TRANSMISSION LINE FOR OPTICAL RADIATION AND APPLICATIONS THEREOF

[75] Inventors: Karl F. Klein, Bruchköbel; Walter Heitmann, Gross-Bierberau, both of Fed. Rep. of Germany

[73] Assignee: Heraeus Quarzschmelze GmbH, Hanau, Fed. Rep. of Germany

[21] Appl. No.: 277,249

[22] Filed: Nov. 29, 1988

[30] Foreign Application Priority Data

Feb. 5, 1988 [DE] Fed. Rep. of Germany ....... 3803413

[51] Int. Cl.⁴ .............................................. G02B 6/16
[52] U.S. Cl. .................................................. 350/96.30
[58] Field of Search ................ 350/96.30, 96.33, 96.29

[56] References Cited

U.S. PATENT DOCUMENTS

| | | | |
|---|---|---|---|
| 4,165,152 | 8/1979 | Shiraishi et al. | 350/96.30 |
| 4,572,609 | 2/1986 | Sakuragi et al. | 350/96.29 X |
| 4,610,506 | 9/1986 | Tokunaga et al. | 350/96.30 X |
| 4,822,136 | 4/1989 | Hicks, Jr. | 350/96.30 X |

Primary Examiner—John D. Lee
Assistant Examiner—Phan T. Heartney
Attorney, Agent, or Firm—Felfe & Lynch

[57] ABSTRACT

A transmission line for optical radiation is disclosed, which has at least one optical fiber with core and cladding. The core consists of vitreous synthetic silicon dioxide, and the cladding of vitreous synthetic silicon dioxide doped with boric oxide and/or fluorine. The fiber is cooled over substantially its entire length to a temperature below 220 K. for the transmission of optical radiation in the wavelength range from 160 to 300 nm. Such transmission lines are used in spectroscopy, in machining processes, in medicine and chemical processes, and for biological purposes.

8 Claims, 1 Drawing Sheet

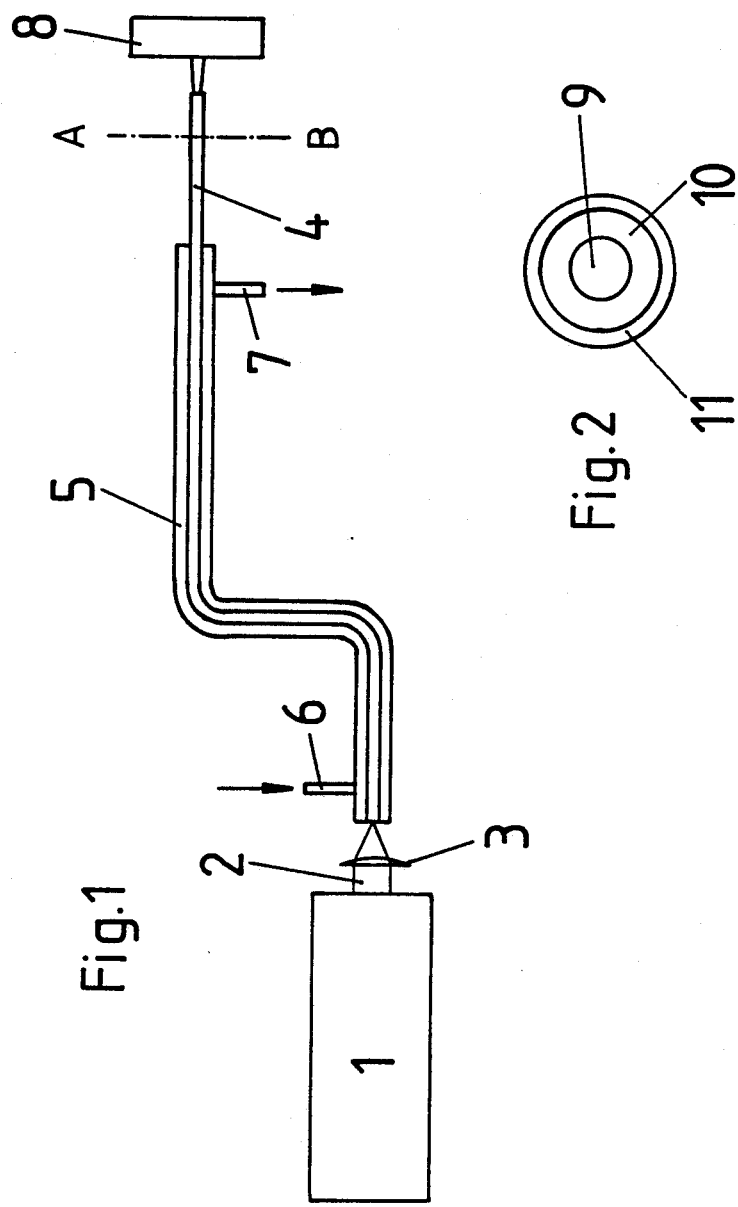

TRANSMISSION LINE FOR OPTICAL RADIATION AND APPLICATIONS THEREOF

The invention relates to a transmission line for optical radiation, which has at least one optical fiber whose core consists of vitreous synthetic silicon dioxide of high purity as regards metal ion contamination, and whose cladding consists of vitreous synthetic silicon dioxide doped with boric oxide and/or fluorine.

The invention furthermore relates to applications for such transmission lines.

DE-PS 25 36 567 discloses a method for the production of synthetic vitreous fused silica free of hydroxyl ions and doped with fluorine, which serves as a cladding substance for optical fibers with a core of synthetic vitreous fused silica.

French published Patent Application No. 22 08 127 discloses optical fibers with a core of pure silicon dioxide and a cladding which consists of silicon dioxide doped with boric oxide or fluorine.

Lastly, optical fibers are disclosed in EP-OS 0 173 183 which have a core of pure synthetic vitreous silica containing hydroxyl and a cladding of vitreous silica doped with fluorine and boric oxide.

Fiber optics of the previously known kind are very suitable in a transmission line for optical radiation when the optical radiation is in a wavelength range above 300 nm. It has been found that the known optical fibers are less suitable for transmission lines with lengths over 10 m if the wavelength of the optical radiation to be transmitted amounts to less than 300 nm, i.e., is in the shortwave ultraviolet spectral range. For wavelengths below 300 nm a marked absorption of the optical radiation begins, which increases with decreasing wavelength. For wavelengths under about 190 nm the known optical fibers become virtually opaque when they are used in a transmission a few meters in length.

The invention has, therefore, an object of producing a transmission line for optical radiation with wavelengths in the range of about 160 to 300 nm.

This object is accomplished in accordance with the invention, for a transmission line of the kind described above, in that, for the transmission of optical radiation with a wavelength ranging from about 160 to 300 nm, the optical fiber is cooled over substantially its entire length to a temperature below 220 K. This surprisingly produces the result that the transmission increases by twice to more than ten times in comparison with the uncooled fiber. Further, it has been observed that the absorption edge of the transmission line of the invention is shifted to shorter wavelengths, so that radiation of shorter wavelength can be transmitted than was formerly possible with optical fibers at room temperature. The reduction of the absorption of the fiber material by cooling produces not only an increase in the transmission: the lesser warming also raises the thermal destruction factor of the fiber.

The optical fiber is advantageously surrounded by an envelope of thermal insulating material. In an advantageous embodiment the envelope is a cooling jacket and has a connection for the input and a connection for the output of the coolant. Preferably the optical fiber is cooled with liquid nitrogen which is passed through the cooling jacket.

At the end at which the optical radiation emits from the fiber a short length of the fiber is advantageously brought uncooled out of the envelope. This improves the flexibility with which the transmission line can be connected at the point of use.

The invention has been found practical not only for optical fibers with a core of vitreous synthetic silicon dioxide and a cladding of vitreous synthetic silicon dioxide doped with boric oxide and/or fluorine, but also for optical fibers in which the core consists of vitreous doped synthetic silicon dioxide in which the dopants do not affect or only slightly affect the ultraviolet absorption. Examples of dopants of this kind are fluorine, boric oxide and aluminum oxide.

A transmission line in accordance with the invention is used preferentially wherever high-power ultraviolet outputs are to be carried from a light source, such as a gas discharge lamp or laser, to a point of use, as for example for machining operations, for medical and biological applications, and for chemical processes. The transmission of ultraviolet radiation through a light conductor offers the following advantages: the hazards connected with the light source ca be reduced, and several points of use can be supplied from a single source.

The use of light conductors in spectroscopy in conjunction with a spectrometer and detector is also advantageous With the transmission line of the invention, measurements can here be performed a wavelengths at which uncooled transmission lines fail.

The following are given as preferred examples of the use of transmission lines in accordance with the invention:

In the field of machining operations, the transmission line of the invention can be used to carry pulsed, short-wave ultraviolet radiation from an excimer laser to vaporize portions of a plastic film that has been applied to an integrated circuit for passivation. The transmission line of the invention can also be used for the production of very fine structures in semiconductor technology by means of photochemical reactions in varnish coatings sensitive to ultraviolet light.

In medicine, the transmission line of the invention can be used in ophthalmology, for example for performing extremely fine incisions to correct the shape of the cornea of the eye by means of short-wave ultraviolet laser radiation. The treatment of psoriasis with ultraviolet radiation of a wavelength in the range from 270 nm to 300 nm is another example of the use of the transmission line of the invention.

In the field of biology, the transmission line of the invention could be used for sterilizing air and surfaces by ultraviolet radiation in the wavelength range between 250 nm and 300 nm.

Lastly, another example of the use of the transmission line of the invention in chemical processing is the production of dielectric insulating or passivating coatings of silicon dioxide in semiconductor technology by precipitation from the gas phase, wherein the reactions of the gaseous or vaporous substances are initiated by photochemical processes by means of ultraviolet radiation. The silicon dioxide layers can be deposited in this manner at relatively low substrate temperatures down to 50° C.

It has been found that, in a transmission line of the invention, when it is cooled with liquid nitrogen to a level of 77 K, the absorption edge of the optical fiber shifts by about 3 to 5 nm toward shorter wavelengths. This corresponds at 170 nm to a lowering of the absorption coefficient of 0.5 cm$^{-1}$ to about 0.2 cm$^{-1}$. In a transmission line of the invention of 10 cm length, the transmission will thereby increase from 0.7% to 14% at 170 nm. For radiation at a wavelength of 193 nm, emitted by an excimer laser, the transmission through a length of 1 m of the transmission line of the invention virtually doubles with cooling to 77 K. It has been found that, in the case of optical radiation at wavelengths in the range from 200 to 300 nm, the transmission line of the invention yields a marked improvement of the transmission, especially when the transmission line lengths amount to 15 m and more.

In accordance with the invention, a transmission line for optical radiation comprises at least one optical fiber having a core comprising vitreous synthetic silicon dioxide of high-purity as regards metal ion contaminants, and having cladding comprising vitreous synthetic silicon dioxide doped with at least one of boric oxide and fluorine. The transmission line includes, for the transmission of optical radiation with a wavelength in the range of about 160 to 300 nm, means for cooling the optical fiber substantially over its entire length to a temperature below 220 K.

For a better understanding of the invention, together with other and further objects thereof, reference is made to the following description, taken in connection with the accompanying drawings, and its scope will be pointed out in the appended claims.

Referring now to the drawings:

FIG. 1 represents diagrammatically a transmission line in accordance with the invention with an optical fiber provided with a cooling jacket for carrying a coolant; and FIG. 2 is a cross section through the fiber along the line AB of FIG. 1.

As can be seen in FIG. 1, a beam 2 of the optical radiation being carried is fed through a vitreous fused silica lens 3 into the one end of the optical fiber 4 and falls on an object 8 to be irradiated. The optical fiber is surrounded by an envelope 5 of thermal insulating material which in this example is in the form of a cooling jacket provided with an inlet connection 6 and an outlet connection 7 for the coolant. As it appears from the figure, the optical fiber is not covered by the cooling jacket over its entire length, but is uncooled at the end emitting the optical radiation, which is close to the object being irradiated. The optical fiber comprises, as can be seen in FIG. 2, a core 9, a cladding 10, and a plastic envelope 11. The core 9 consists of vitreous synthetic silicon dioxide of high purity in regard to metal ion contaminants. The cladding consists in this embodiment of fluorine-doped synthetic silicon dioxide. The plastic envelope prevent microcrack losses from the fiber and damage to the fiber surface. In the embodiment the diameter usually range from 2 to 1000 μm. The thickness of cladding 10 is 20 μm; usually the cladding thickness ranges from 10 to 50 μm. The length of the transmission line depends on the wavelength. For very short wavelengths, i.e., in the range below 200 nm, the length of the transmission line amount to about 0.5 m to 3 m. In the range from 200 to 300 nm, the transmission length can amount to more than 15 m.

While there has been described what is at present considered to be the preferred embodiment of this invention, it will be obvious to those skilled in the art that various changes and modifications may be made therein without departing from the invention, and it is, therefore, aimed to cover all such changes and modifications as fall within the true spirit and scope of the invention.

What is claimed is:

1. Transmission line for optical radiation in the range of about 160 to 300 nm, comprising:
   means for transmitting optical radiation comprising at least one optical fiber having a core comprising vitreous synthetic silicon dioxide of high-purity as regards metal ion contaminants, and having cladding comprising vitreous synthetic silicon dioxide doped with at least one of boric oxide and fluorine, and means for cooling the optical fiber substantially over its entire length to a temperature below 220 K for enabling the optical fiber to transmit optical radiation with a wavelength in the range of about 160 to 300 nm.

2. Transmission line in accordance with claim 1, in which said means for cooling said optical fiber comprises an envelope of thermal insulating material surrounding said optical fiber.

3. Transmission line in accordance with claim 2, in which said envelope is configured as a cooling jacket and has a connection for the input of a coolant and a connection for the removal of the coolant.

4. Transmission line in accordance with claim 1, in which said means for cooling said optical fiber comprises liquid nitrogen.

5. Transmission line in accordance with claim 1, which includes fiber piece that is short in comparison to the entire length of said optical fiber, said fiber piece being uncooled at its end emitting optical radiation.

6. Transmission line in accordance with claim 1, in which said core of said optical fiber comprises vitreous, synthetic, doped silicon dioxide, the dopant at most only slightly affecting the ultraviolet absorption.

7. Method of using a transmission line for optical radiation in the range of about 160 to 300 nm, comprising transmitting optical radiation through at least one optical fiber having a core comprising vitreous synthetic silicon dioxide of high-purity as regards metal ion contaminants, and having cladding comprising vitreous synthetic silicon dioxide doped with at least one of boric oxide and fluorine, and shifting the absorption edge of the optical fiber towards shorter wavelengths by cooling the optical fiber substantially over its entire length to a temperature below 220 K for transmitting optical radiation with a wavelength in the range of about 160 to 300 nm, in spectroscopy for connecting a spectrometer to a detector.

8. Method of using a transmission line for optical radiation in the range of about 160 to 300 nm, comprising transmitting optical radiation through at least one optical fiber having a core comprising vitreous synthetic silicon dioxide of high-purity as regards metal ion contaminants, and having cladding comprising vitreous synthetic silicon dioxide doped with at least one of boric oxide and fluorine, and shifting the absorption edge of the optical fiber towards shorter wavelengths by cooling the optical fiber substantially over its entire length to a temperature below 220 K for transmitting optical radiation with a wavelength in the range of about 160 to 300 nm, for the transmission of high-power ultraviolet light.

* * * * *